United States Patent
De Witte et al.

(10) Patent No.: US 10,143,141 B2
(45) Date of Patent: Dec. 4, 2018

(54) HARVESTER CONCAVE WITH MODULARIZED INDEPENDENTLY CONFIGURABLE AND DETACHABLE ASSEMBLIES

(71) Applicant: CNH Industrial America LLC, New Holland, PA (US)

(72) Inventors: Joris De Witte, Halle (BE); Johan A. Van Der Haegen, Gavere (BE); Tom N. N. Somers, Aalter (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/037,587

(22) PCT Filed: Nov. 18, 2014

(86) PCT No.: PCT/EP2014/074881
§ 371 (c)(1),
(2) Date: May 18, 2016

(87) PCT Pub. No.: WO2015/075021
PCT Pub. Date: May 28, 2015

(65) Prior Publication Data
US 2016/0295802 A1    Oct. 13, 2016

(30) Foreign Application Priority Data
Nov. 20, 2013    (BE) .................................. 2013/0780

(51) Int. Cl.
*A01F 12/24*    (2006.01)
*A01F 12/26*    (2006.01)
(Continued)

(52) U.S. Cl.
CPC .............. *A01F 12/24* (2013.01); *A01D 41/06* (2013.01); *A01F 7/04* (2013.01); *A01F 12/22* (2013.01);
(Continued)

(58) Field of Classification Search
CPC .......... A01F 12/24; A01F 12/26; A01F 12/00; B02C 13/284
(Continued)

(56) References Cited

U.S. PATENT DOCUMENTS

| 755,152 | A | * | 3/1904 | Mishler | .................... A01F 12/28 460/109 |
| 2,159,664 | A | * | 5/1939 | Lindgren | ................. A01F 12/24 460/110 |

(Continued)

FOREIGN PATENT DOCUMENTS

| DE | 3303413 A1 | * | 8/1984 | ............. A01F 12/24 |
| DE | 102011055493 A1 | * | 5/2013 | ............. A01F 12/26 |

(Continued)

OTHER PUBLICATIONS

PCT/EP2014/074881, International Search Report, dated Feb. 10, 2015, 4 pages.
(Continued)

*Primary Examiner* — Arpad Fabian-Kovacs
(74) *Attorney, Agent, or Firm* — Peter K. Zacharias; Patrick M. Sheldrake

(57) ABSTRACT

A threshing section of an agricultural harvester. The threshing section includes a threshing drum and at least one concave assembly positioned proximate to the threshing drum. The concave assembly has a plurality of modularized assemblies, each modularized assembly being independently configurable.

16 Claims, 8 Drawing Sheets

(51) Int. Cl.
  *A01D 41/06* (2006.01)
  *A01F 7/04* (2006.01)
  *A01F 12/22* (2006.01)
  *A01F 12/44* (2006.01)
  *A01F 12/46* (2006.01)

(52) U.S. Cl.
  CPC ............ *A01F 12/26* (2013.01); *A01F 12/442* (2013.01); *A01F 12/446* (2013.01); *A01F 12/46* (2013.01)

(58) Field of Classification Search
  USPC .................................................. 460/109, 108
  See application file for complete search history.

(56) References Cited

U.S. PATENT DOCUMENTS

| | | | | | |
|---|---|---|---|---|---|
| 2,457,259 | A * | 12/1948 | Moll | ........................ | A01F 12/24 241/190 |
| 3,439,684 | A * | 4/1969 | Rathje | ..................... | A01F 12/24 460/110 |
| 3,470,881 | A * | 10/1969 | De Pauw | ................ | A01F 12/20 460/109 |
| 3,481,342 | A * | 12/1969 | De Pauw | .................. | A01F 7/06 460/68 |
| 3,515,145 | A * | 6/1970 | Herbsthofer | ............ | A01F 12/24 460/110 |
| 3,537,459 | A * | 11/1970 | Thomas | ................... | A01F 12/20 460/110 |
| 3,568,682 | A * | 3/1971 | Knapp | ..................... | A01F 12/24 460/108 |
| 3,678,938 | A * | 7/1972 | De Coene | ............. | A01F 12/442 460/73 |
| 3,734,103 | A * | 5/1973 | Mathews | ................... | A01F 7/06 460/108 |
| 3,871,384 | A * | 3/1975 | Depauw | .................. | A01F 12/00 460/109 |
| 3,891,152 | A * | 6/1975 | Guggenheimer | ..... | B02C 13/284 241/73 |
| 4,004,404 | A | 1/1977 | Rowland-Hill et al. | | |
| 4,031,901 | A * | 6/1977 | Rowland-Hill | ......... | A01F 12/24 460/108 |
| 4,383,652 | A * | 5/1983 | Osborne | ................ | A01F 29/06 241/101.742 |
| 4,711,075 | A * | 12/1987 | Strong | ..................... | A01F 12/24 460/110 |
| 4,711,252 | A * | 12/1987 | Bernhardt | ................. | A01F 7/06 460/107 |
| 4,875,891 | A * | 10/1989 | Turner | .................. | A01F 12/442 460/108 |
| 4,909,772 | A * | 3/1990 | Kuchar | .................. | A01F 12/24 460/110 |
| 4,988,326 | A * | 1/1991 | Bennett | .................... | A01F 12/24 460/108 |
| 5,024,631 | A * | 6/1991 | Heidjann | ................ | A01F 12/26 460/109 |
| 5,489,239 | A * | 2/1996 | Matousek | ............... | A01F 12/28 460/109 |
| 5,919,087 | A * | 7/1999 | Strong | ..................... | A01F 12/24 460/109 |
| 6,193,604 | B1 * | 2/2001 | Ramp | ..................... | A01F 12/24 460/109 |
| 6,358,142 | B1 * | 3/2002 | Imel | ........................ | A01F 12/28 460/107 |
| 6,398,639 | B1 * | 6/2002 | Dammann | .............. | A01F 12/26 460/107 |
| 6,485,364 | B1 * | 11/2002 | Gryspeerdt | ........ | A01D 41/1271 460/107 |
| 6,537,148 | B2 * | 3/2003 | Schwersmann | ....... | A01F 12/442 460/107 |
| 7,153,204 | B2 * | 12/2006 | Esken | ...................... | A01F 12/28 460/109 |
| 8,454,416 | B1 * | 6/2013 | Estes | ....................... | A01F 12/24 460/107 |
| 8,628,390 | B2 * | 1/2014 | Baltz | ....................... | A01F 12/24 460/109 |
| 8,721,411 | B2 * | 5/2014 | Reiger | .................... | A01F 12/26 460/108 |
| 9,119,349 | B2 * | 9/2015 | Ricketts | .................. | A01F 12/26 |
| 9,149,001 | B2 * | 10/2015 | Holtmann | ............... | A01F 12/26 |
| 9,504,204 | B2 * | 11/2016 | Kile | ........................ | A01F 12/26 |
| 9,723,791 | B1 * | 8/2017 | Kile | ........................ | A01F 12/24 |
| 9,723,792 | B1 * | 8/2017 | Kile | ........................ | A01F 12/26 |
| 2005/0197176 | A1 * | 9/2005 | Foster | .................... | A01F 12/24 460/108 |
| 2007/0178951 | A1 * | 8/2007 | Voss | ........................ | A01F 12/28 460/109 |
| 2014/0087793 | A1 * | 3/2014 | Regier | .................. | A01F 12/446 460/59 |
| 2015/0250101 | A1 * | 9/2015 | Kile | ........................ | A01F 12/26 460/108 |
| 2017/0164559 | A1 * | 6/2017 | Matousek | ............... | A01F 7/062 |

FOREIGN PATENT DOCUMENTS

| | | |
|---|---|---|
| EP | 0516894 A1 | 12/1992 |
| EP | 1159867 A1 | 12/2001 |
| FR | 1508023 | 12/1967 |
| GB | 1230358 | 4/1971 |
| JP | 2004275085 | 10/2004 |

OTHER PUBLICATIONS

PCT/EP2014/074881, Written Opinion, dated Feb. 10, 2015, 8 pages.

* cited by examiner

HARVESTER CONCAVE WITH MODULARIZED INDEPENDENTLY CONFIGURABLE AND DETACHABLE ASSEMBLIES

CROSS REFERENCE TO RELATED APPLICATIONS

This application is the National Stage of International Application No. PCT/EP2014/074881 filed Nov. 18, 2014, which claims priority to Belgian Application No. 2013/0780 filed Nov. 20, 2013, the contents of which are incorporated herein by reference.

BACKGROUND OF THE INVENTION

The present invention relates to agricultural harvesters such as combines, and, more particularly, to concave systems used in such combines.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger. The clean grain auger conveys the grain to a grain tank for temporary storage.

The concave has a set of grid openings and when crops such as rice are harvested with a combine a problem can arise relative to desired changes in the grid openings.

What is needed in the art is a grid system in the concave that is easily reconfigurable to meet the demands of grain harvesting.

SUMMARY OF THE INVENTION

The present invention provides a method and apparatus to reconfigure a concave in a threshing section of an agricultural harvester.

The invention in one form is directed to a threshing section of an agricultural harvester, the threshing section including a rotor and at least one concave assembly positioned proximate to the rotor. The concave assembly comprises a cylindrical frame and has a plurality of modularized assemblies, with each modularized assembly being independently configurable and detachably connected to the frame of the concave assembly.

The invention in another form is directed to an agricultural harvester having a chassis supporting a threshing section. The threshing section includes a rotor and at least one concave assembly positioned proximate to the rotor. The concave assembly comprises a cylindrical frame and has a plurality of modularized assemblies, with each modularized assembly being independently configurable and detachably connected to the frame of the concave assembly.

The invention in yet another form is directed to method of operation of a threshing section of an agricultural harvester, the threshing section including a rotor and at least one concave assembly positioned proximate to the rotor. The concave assembly comprises a cylindrical frame and a plurality of modularized assemblies, with each modularized assembly being detachably connected to the frame of the concave assembly and configured to be independently configurable. The method includes the steps of removing the modularized assembly from the frame of the concave assembly, modifying the position of a rod and/or the number of rods in the modularized assembly, and replacing the modularized assembly in the frame of the concave assembly.

The present invention advantageously provides a reconfigurable concave assembly.

Another advantage of the present invention is that the rods of the concave assembly are interchangeable.

Yet another advantage of the present invention is that the concave accepts modules that are themselves reconfigurable.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
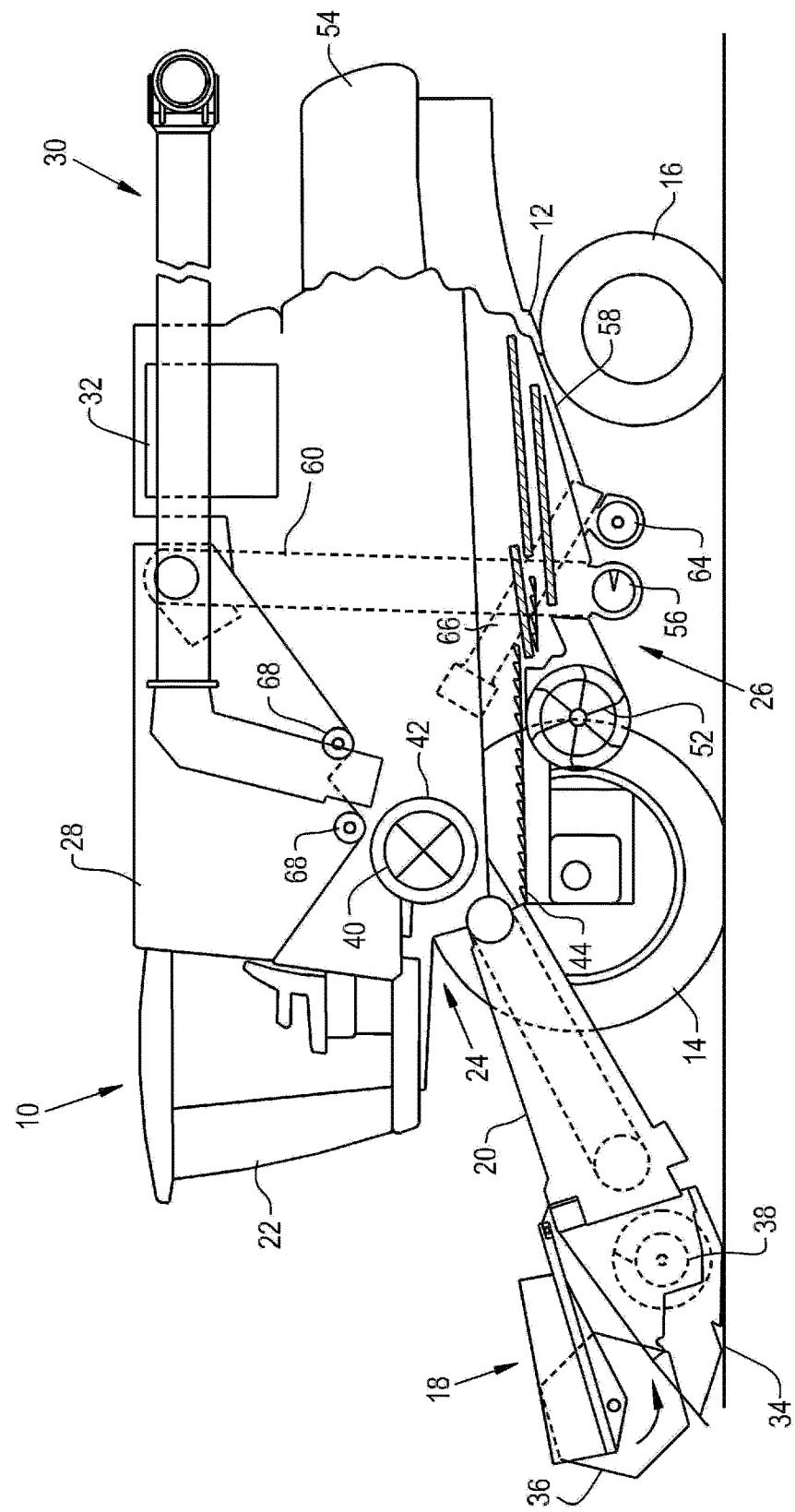
FIG. 1 is a side view of an embodiment of an agricultural harvester in the form of a combine which includes an embodiment of a concave system of the present invention.
Figure 2:
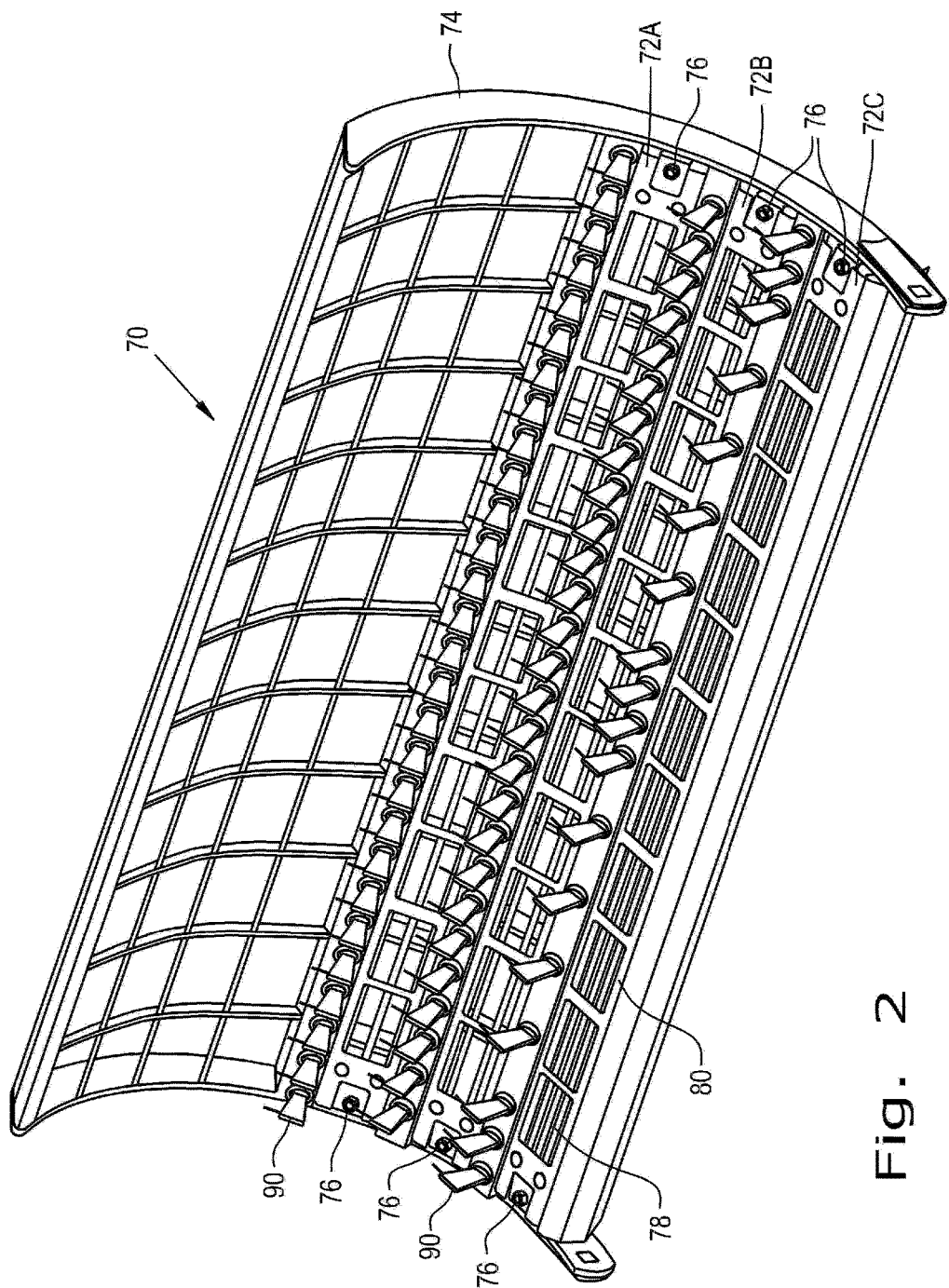
FIG. 2 is a perspective view of the concave assembly used in the combine of FIG. 1 configured in one grid configuration.
Figure 3:
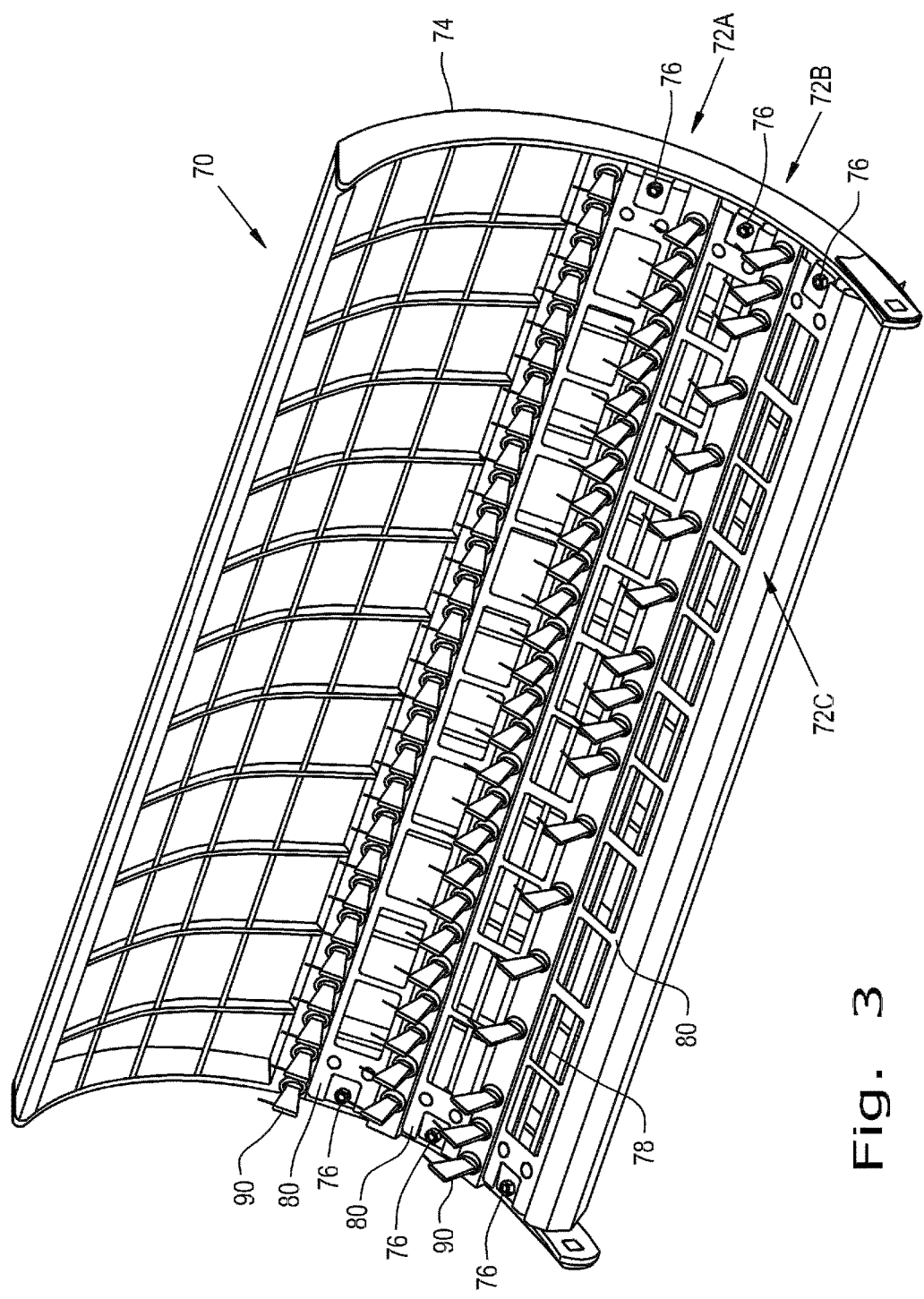
FIG. 3 is another perspective view of the concave assembly used in the combine of FIG. 1 configured in another grid configuration.
Figure 4:
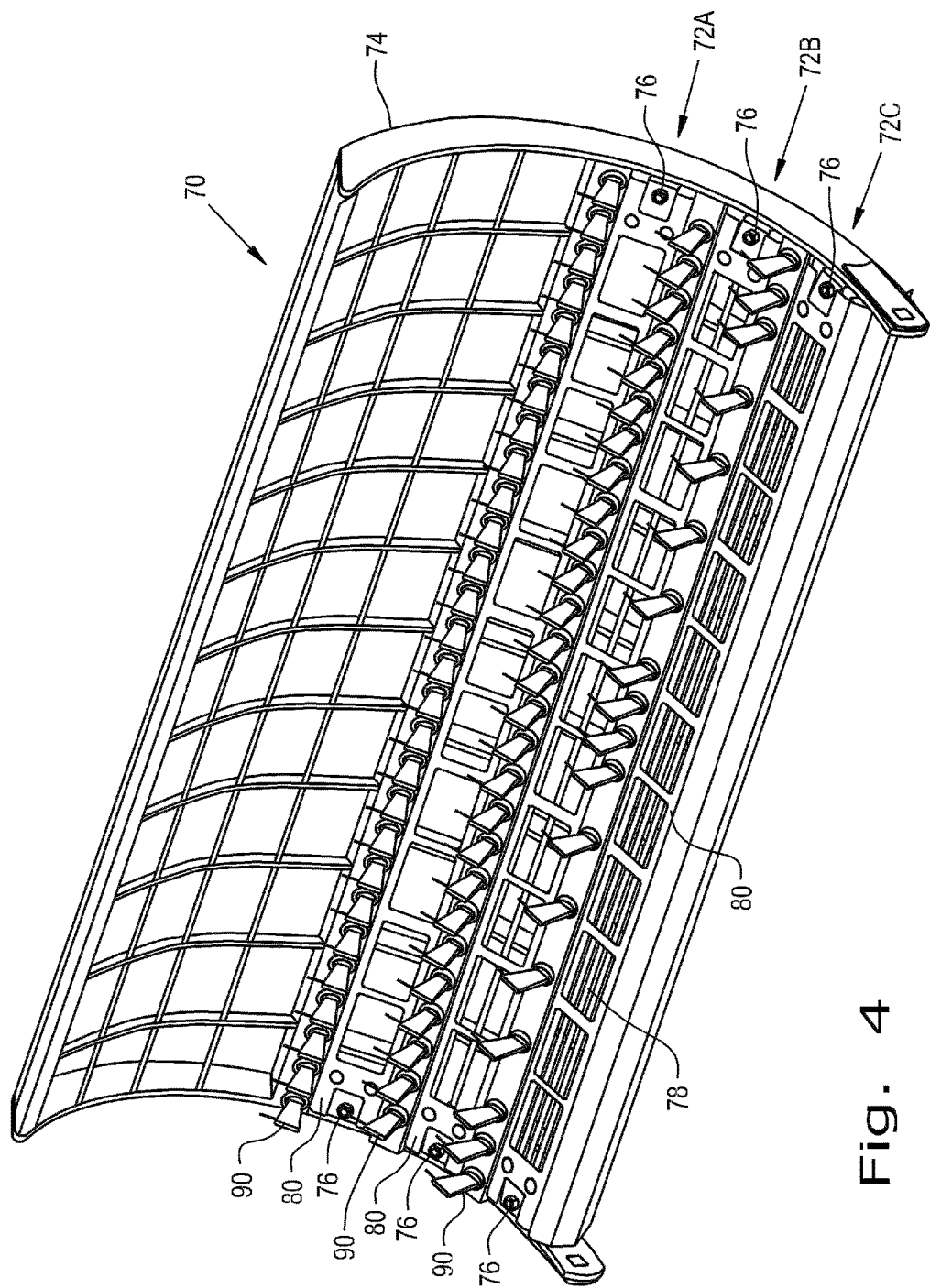
FIG. 4 is yet another perspective view of the concave assembly used in the combine of FIG. 1 configured in another grid configuration.
Figure 5:
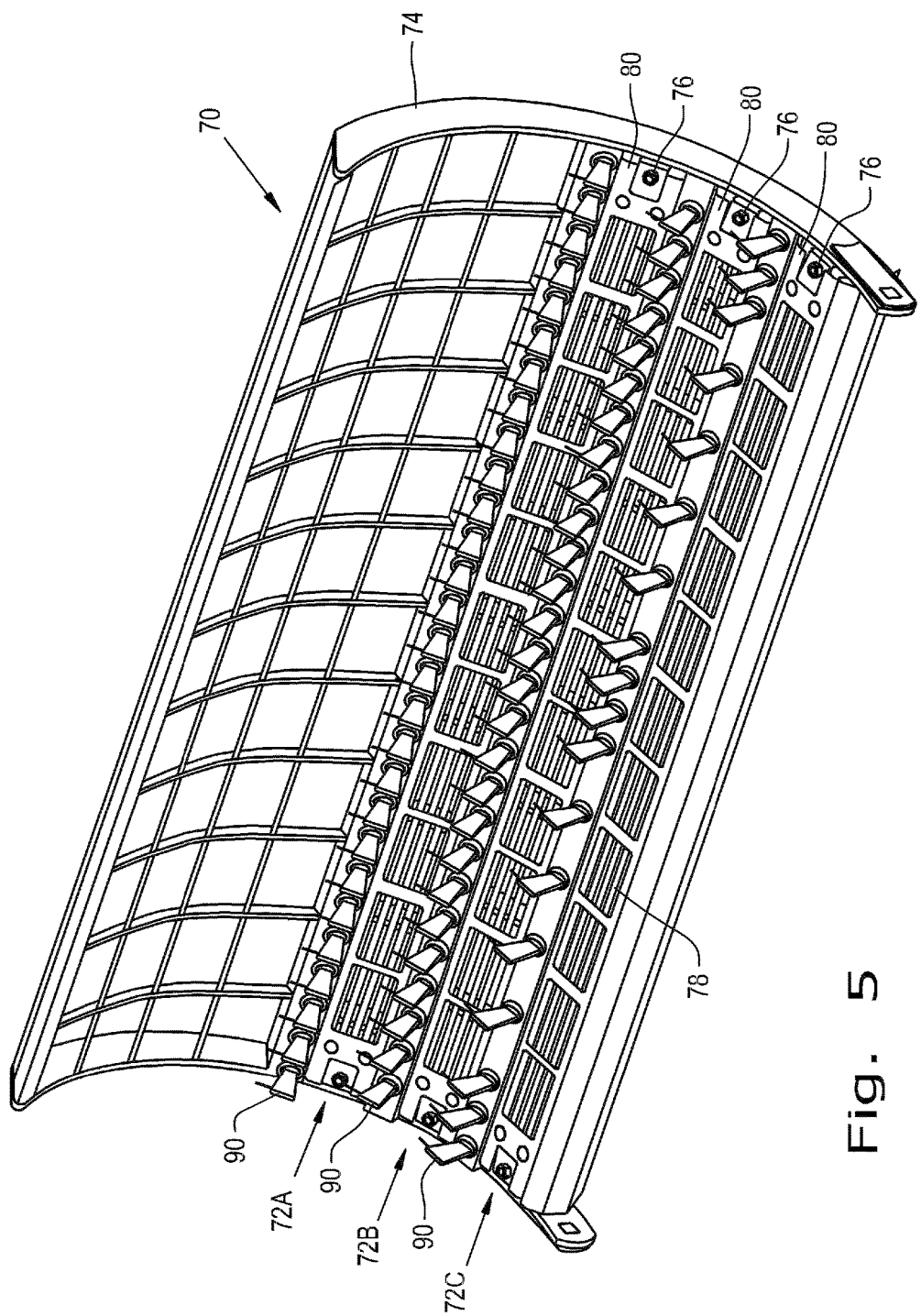
FIG. 5 is yet another perspective view of the concave assembly used in the combine of FIG. 1 configured in another grid configuration.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing system 24, a cleaning system 26, a grain tank 28, and an unloading auger 30.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing system 24, and is selectively vertically movable using appropriate actuators, such as hydraulic cylinders (not shown).

The threshing and separating system 24 is a traversely oriented threshing system, and generally includes a threshing drum 40 at least partially enclosed by and rotatable within a corresponding perforated concave 42. The cut crops are threshed and separated by the rotation of the threshing drum 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain which has been separated by the threshing and separating assembly 24 falls onto a grain pan 44 and is conveyed toward the cleaning system 26. The cleaning system 26 may include an optional pre-cleaning sieve, an upper sieve (also known as a chaffer sieve), a lower sieve (also known as a cleaning sieve), and a cleaning fan 52. Grain on the sieves is subjected to a cleaning action by fan 52 which provides an airflow through the sieves to remove chaff and other impurities such as dust from the grain by making this material airborne for discharge from a straw hood 54 of the combine 10. The grain pan 44 and a pre-cleaning sieve oscillate in a fore-to-aft manner to transport the grain and finer non-grain crop material to the upper surface of an upper sieve.

Clean grain falls to a clean grain auger 56 positioned crosswise below and in front of a lower sieve. The clean grain auger 56 receives clean grain from each sieve and from a bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough. The tailings are transported via a tailings auger 64 and the return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from the combine 10.

The non-grain crop material proceeds through a residue handling system. The residue handling system includes a chopper, counter knives, a windrow door and a residue spreader.

Now, additionally referring to FIGS. 2-8 there is shown a concave assembly 70, which is part of the concave 42, with the concave 42 being made up of one or more of the concave assemblies 70. The main structure of each concave assembly 70 is formed by a cylindrical frame 74. Rows of spike teeth 90, or simply spikes 90 extend from the frame 74, and the spikes 90 may have various spacings therebetween, as shown. Although not shown, the threshing drum 40 may also have spikes extending therefrom that pass by the spikes 90 of the concave assembly 70. Each of the concave assemblies 70 include a plurality of modularized assemblies 72, shown in the figures as the modularized assemblies 72A, 72B and 72C and detachably connected to the frame 74 of the concave assembly 70. The modularized assemblies 72A-C are held to the frame 74 by fasteners 76. The modularized assemblies 72A-C are interchangeable with each other, although it is also contemplated to have assemblies that would be configured to only fit in certain locations.

Each of the modularized assemblies 72A-C include several rods 78 supported by a structural member 80. The rods 78 extend through a series of receiving members 82 that are connected to the structural member 80. The receiving members 82 have a series of uniformly spaced openings 84. The openings 84 are sized to accept a rod 78 that may have a selected diameter, and as can be seen in the figures, varying numbers and positioning of the rods 78 in each of the modularized assemblies can be arranged. The figures illustrating a variety of configurations, but not limiting the invention to any particular one of the illustrated configurations. It is also contemplated that the receiving members 82 may have different numbers of openings, and/or have different opening shapes to accommodate other shaped rods.

A retaining plate 86 is coupled to the structural member 80 by fasteners 88 to preclude the rods 78 from shifting out of the receiving members 82. The retaining plate 86 also has a hole therein to accommodate the fastener 76. The retaining plate 86 fits over a portion of the side of the rods 78 and has a stepped section that is adjacent to the end of the rods 78.

The modularized assemblies 72A-C allow the quick easy modification of the grid patterns of the concave assembly 70, thereby allowing customization of the harvesting process to match the characteristics of the grain that is being harvested. The modularized assemblies 72A-C may be removed from the concave assembly 70, while the frame 74 of the concave assembly 70 remains in position in the combine 10. It is also possible that the modularized assemblies 72A-C may remain attached to the concave assembly 70 as the rods 78 are slid out of one end of the modularized assembly 72A-C. Alternatively, the concave assembly 70 may be removed from the combine 10 and the rods 78 be changed as desired in the modularized assemblies 72A-C.

Figure 6:
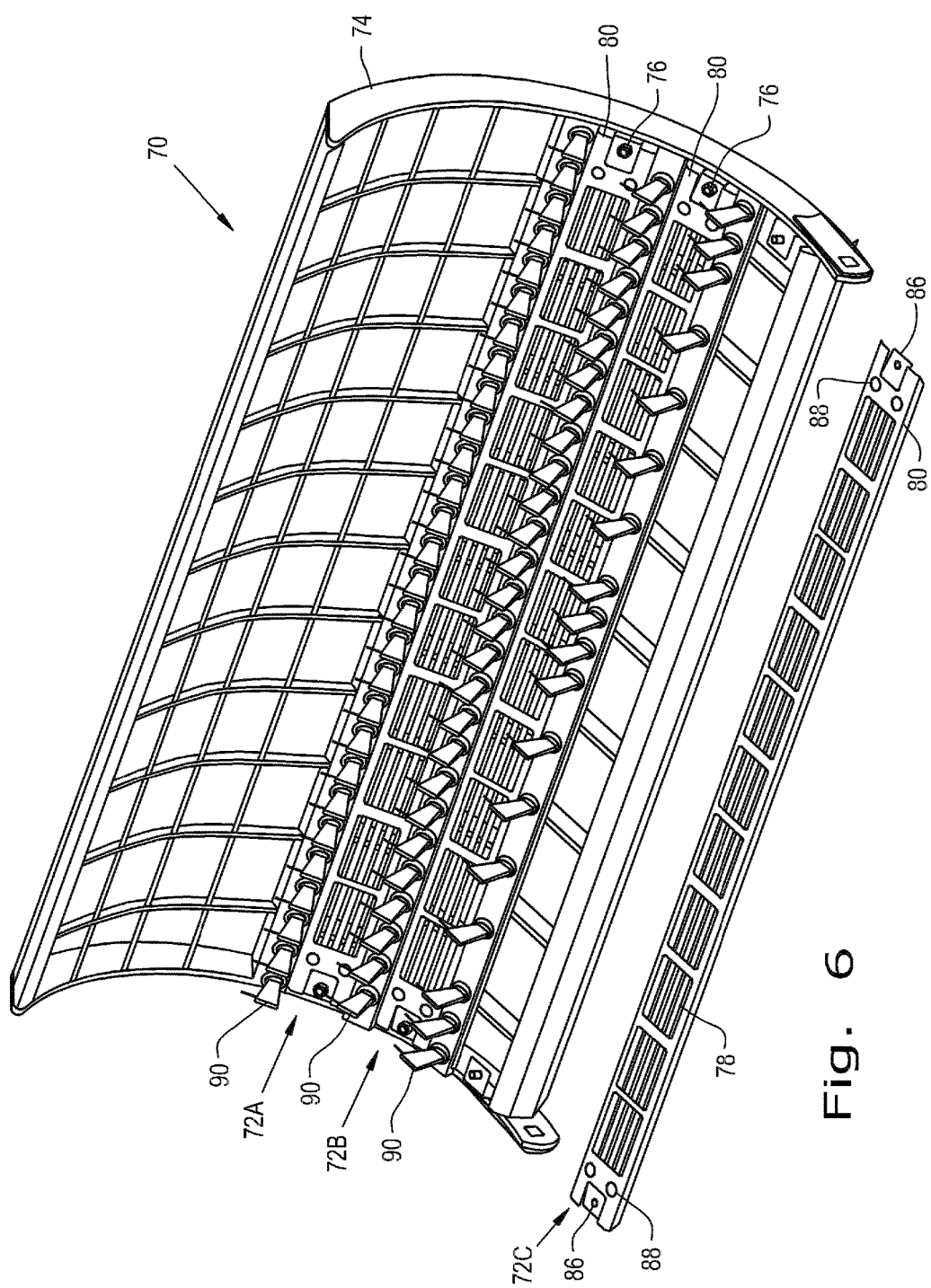
FIG. 6 is yet another perspective view of the concave assembly used in the combine of FIG. 1 configured in another grid configuration, having one modularized assembly removed.
Figure 7:
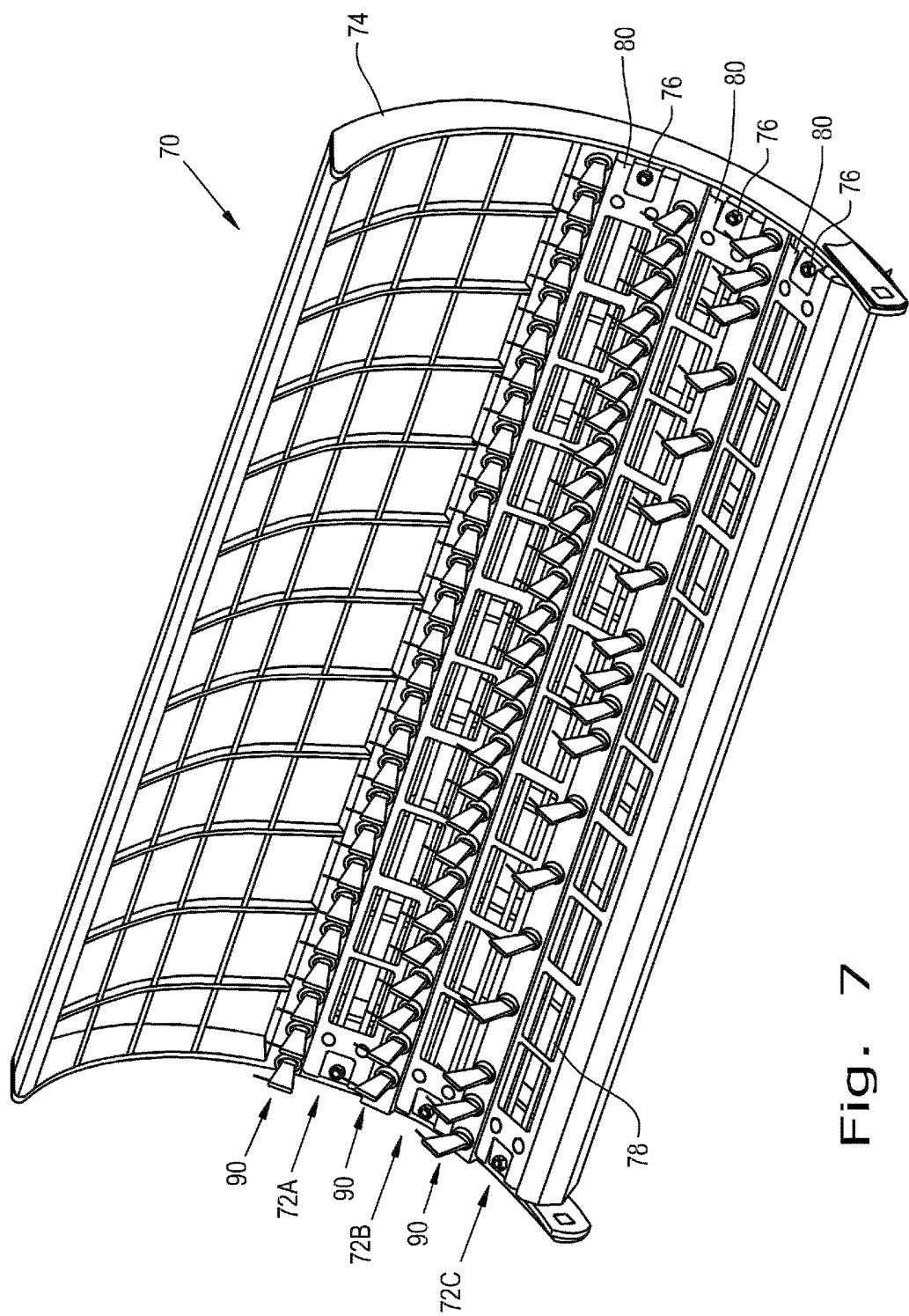
FIG. 7 is yet another perspective view of the concave assembly used in the combine of FIG. 1 configured in another grid configuration.
Figure 8:
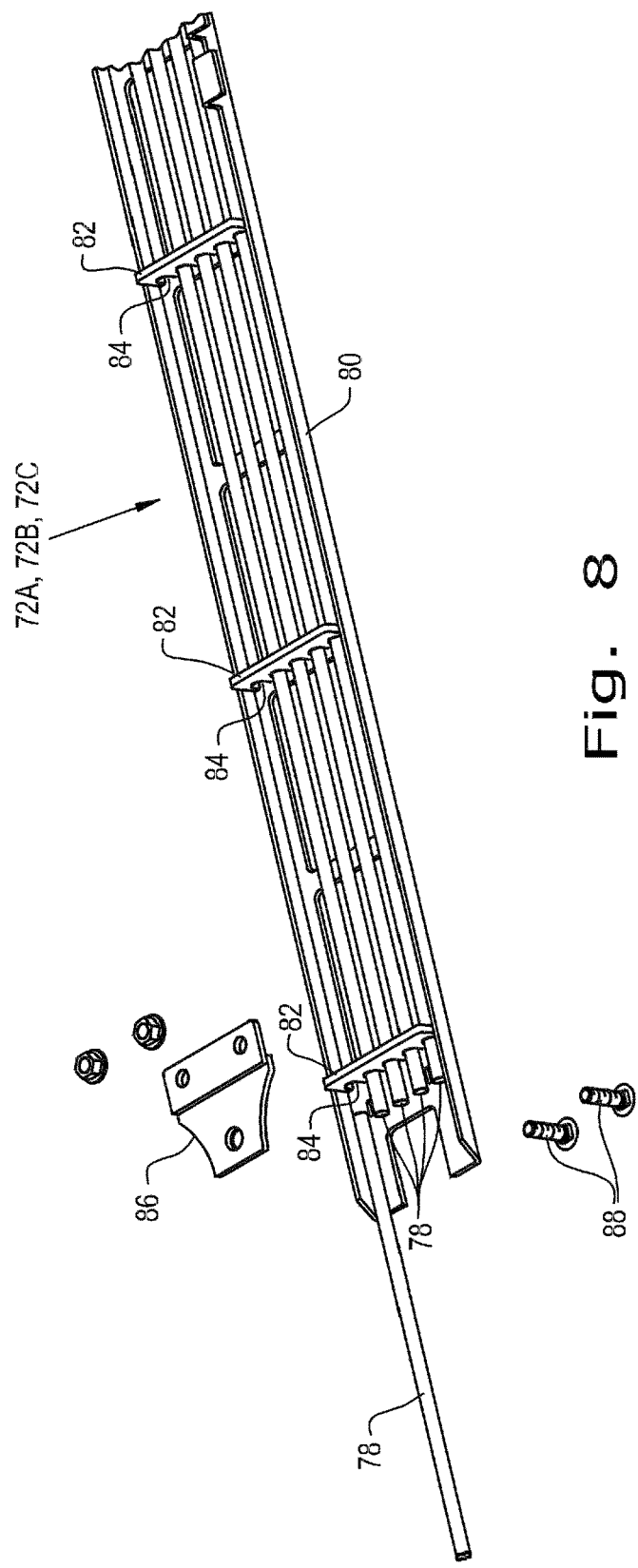
FIG. 8 is an exploded view of one of the modularized assemblies, used in the concave assemblies of FIGS. 2-7, showing a rod being removed therefrom.

The grid pattern of openings is modified by the removal of selected modularized assemblies 72A-C accomplished by the removal of the fasteners 76 as illustrated in FIG. 6. Then as shown in FIG. 8, the fasteners 88 are removed from the structural member 80 and the retaining plate 86, with the retaining plate 86 then being removed. The rods 78 are then inserted, removed and/or moved to selected locations by sliding them through the openings 84 in the retaining members 82, in order to form the desired grid configuration. While the rods 78 are round to minimize grain pealing or cracking, other shapes are also within the scope of the present invention. Not only does the positioning of the rods 78 influence the spacing, but the diameter of the rods 78 can be changed to alter the spacing.

Additionally, the receiving members 82 are removable from the structural member 80 so that new receiving members 82 may be installed on the structural member 80. The new receiving members can have different shaped openings 84, different numbers of openings 84, different sizes of openings 84, to thereby allow customization of the modularized assemblies 72A-C. The receiving members 82 may utilize fasteners to connect them to the structural member 80. It is also contemplated that the receiving members 82 may be inserted through corresponding slots in the structural member 80.

Alternatively, also the spikes 90 may be provided on interchangeable modular assemblies, similar to the assembly modules 72A-C for the rods 78. This would make it easier to quickly change the number, shape and/or placement of the spikes 90 at the concave assembly 70 inside wall. It is to be noted that the spikes 90 shown in the drawings of the above described embodiments are used for threshing rice. The invention is, however, not strictly limited to rice concaves. Also concaves used for other crop types may benefit from the modular construction according to the invention. Such concaves would most likely not comprise any spikes 90 on their inner surface.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A threshing section of an agricultural harvester, the threshing section comprising:
a threshing drum;
at least one concave assembly positioned proximate to the threshing drum, the at least one concave assembly comprising a cylindrical frame and a plurality of modularized assemblies, each of the plurality of modularized assemblies being independently configurable and detachably connected to the frame of the at least one concave assembly, each of the plurality of modularized assemblies being removable from the cylindrical frame of the at least one concave assembly; and
a plurality of rods that are inserted within the at least one modularized assembly, each of the plurality of modularized assemblies comprising at least one of the plurality of rods extending substantially from one end of the each of the plurality of modularized assemblies to an opposite end of the each of the plurality of modularized assemblies, each of the plurality of modularized assemblies further comprising a structural member having a plurality of receiving members attached thereto, the at least one rod of the each of the plurality of modularized assemblies being supported by the plurality of receiving members of the structural member of the each of the plurality of modularized assemblies.

2. The threshing section of claim 1, wherein each of the plurality of modularized assemblies is constructed such that it can remain connected to the at least one concave assembly while the each of the plurality of modularized assemblies is reconfigured.

3. The threshing section of claim 1, wherein each of the rods extend substantially from one end of the each of the plurality of modularized assemblies to an opposite end of the each of the plurality of modularized assemblies.

4. The threshing section of claim 1, wherein each of the plurality of receiving members of the structural member of each of the plurality of modularized assemblies comprises a plurality of openings, the at least one rod of the each of the plurality of modularized assemblies being positioned in one of the plurality of openings of the each of the plurality of receiving members of the structural member of the each of the plurality of modularized assemblies.

5. The threshing section of claim 4, wherein the plurality of openings of each of the plurality of receiving members of the structural member of each of the plurality of modularized assemblies are substantially uniformly separated.

6. The threshing section of claim 4, wherein the at least one rod of the each of the plurality of modularized assemblies has a circular cross section.

7. The threshing section claim 4, wherein the plurality of openings of each of the plurality of receiving members of the structural member of each of the plurality of modularized assemblies are configured to receive rods of differing diameters.

8. The threshing section of claim 1, further comprising at least one retaining plate removably coupled to the structural member of each of the plurality of modularized assemblies, the at least one retaining plate preventing a removal of the at least one rod of the each of the plurality of modularized assemblies from the structural member of the each of the plurality of modularized assemblies when the at least one retaining plate is coupled to the structural member of the each of the plurality of modularized assemblies.

9. The threshing section of claim 3, wherein the plurality of rods of each of the plurality of modularized assemblies is up to five rods.

10. The threshing section of claim 3, wherein the plurality of rods of each of the plurality of modularized assemblies are interchangeable.

11. The threshing section of claim 8, wherein the at least one retaining plate removably coupled to the structural member of each of the plurality of modularized assemblies of the at least one concave assembly is connected to the frame.

12. The threshing section of claim 1, wherein the at least one concave assembly and the threshing drum are adapted to be used in harvesting rice, and at least one of the at least one concave assembly and the threshing drum further comprises spikes extending therefrom.

13. A method of adjusting the threshing section according to claim 1, the method comprising steps of:
removing at least one of the plurality of modularized assemblies from the frame of the at least one concave assembly;
modifying at least one of a position of a rod and a number of rods in the at least one of the plurality of modularized assemblies; and
replacing the at least one of the plurality of modularized assemblies in the frame of the at least one concave assembly.

14. The method of claim 13, the method further comprising the steps of:
removing a retaining plate from an end of at least one of the plurality of modularized assemblies prior to the modifying step; and
replacing the retaining plate to the end of the at least one modularized assembly.

15. A threshing section of an agricultural harvester, the threshing section comprising:
a threshing drum;
at least one concave assembly positioned proximate to the threshing drum, the at least one concave assembly comprising a cylindrical frame and at least one modularized assembly, the at least one modularized assembly being independently configurable and detachably connected to the frame of the at least one concave assembly, the at least one modularized assembly being removable from the cylindrical frame of the at least one concave assembly; and
a plurality of rods that are inserted within the at least one modularized assembly, at least one of the plurality of rods extending substantially from one end of the at least one modularized assembly to an opposite end of the at least one modularized assembly, the at least one modularized assembly comprising a structural member having at least one receiving member attached thereto, the at least one rod being supported by the at least one receiving member.

16. The threshing section of claim 15, wherein the at least one receiving member comprises a plurality of openings, the at least one rod being positioned in one of the plurality of openings.

\* \* \* \* \*